3,118,000
POLYOXYALKYLENE SURFACE-ACTIVE AGENTS

Jean Dupré, Levittown, and Fred E. Boettner, Huntingdon Valley, Pa., assignors to Rohm & Haas Company, Philadelphia, Pa., a corporation of Delaware
No Drawing. Filed Aug. 10, 1959, Ser. No. 832,504
8 Claims. (Cl. 260—584)

This invention is concerned with polymeric non-ionic surface-active agents as new compositions of matter. In particular, these compounds are specific compositions consisting of three portions, an initial hydrophobic portion, a large hydrophilic poly(ethylene-oxy) segment positioned adjacent to the hydrophobic portion, and a large terminal (poly(propylene-oxy)) segment. The hydrophobic portion may be any one of a number of well-known hydrophobic groups, derived, for example, from a long chain alkyl phenol, a branched chain aliphatic alcohol, or a high molecular weight straight chain aliphatic amine.

The compounds of this invention may typically be represented by the following formulae:

(1)
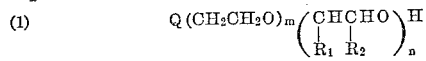

and (2)
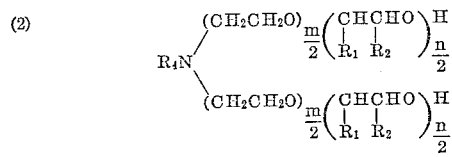

in which $Q = R_3O$ or $R_4NH$;

$R_1$ and $R_2 = CH_3$ or H;

with $R_1 = CH_3$ when $R_2 = H$ and $R_2 = CH_3$ when $R_1 = H$;

$R_3$ consists of an alkylated phenyl containing a total of 4 to 18 carbon atoms in the alkyl groups or a straight or branched chain alkyl group having 8 to 18 carbon atoms;

$R_4$ is a straight chain alkyl group with 8 to 18 carbon atoms;

and $m$ and $n$ represent the average number of mols of ethylene oxide and propylene oxide per mol of hydrophobe, $m$ being a number from 15 to 45 and $n$ a number from 15 to 67.5, the ratio of $n$ over $m$ being in the range of 1:1 to 1.5:1.

The defined novel compositions are mainly anhydrous light yellow liquids at room temperature having rather low freezing points which permit ready incorproation with a cold alkaline base. They are extremely low foaming surfactants which are especially useful in mechanical dishwashing applications. Their principal feature is their unusual ability to defoam aqueous dispersions containing proteins and other types of foam-causing food soils, such as eggs, milk, etc. This exceptional defoaming capacity appears to be primarily the surprising result of the combination of oxyethylene and oxypropylene units in much greater amounts than heretofore have been jointly employed in a surface-active agent, plus the positioning of the oxyethylene centrally between the hydrophobe and the terminal oxypropylene group.

Our novel compounds are prepared by the condensation of the particular hydrophobe employed with 15-45 mols of ethylene oxide followed by the further reaction with 15-67.5 mols of propylene oxide. This preparation may typically be accomplished as follows.

One molar equivalent of the long chain alcohol or alkylphenol is heated to 120°–150° C. with a catalytic amount, e.g., .05 molar equivalent, of a strong base such as sodium hydroxide. Any water in the flask is then removed by flushing the flask with nitrogen. Addition of ethylene oxide is then started. The reaction may advantageously be carried out at slight pressure, for example, at about 5 lbs. per sq. in. pressure in a glass apparatus or at 20 lbs. per sq. in. or higher in a metal autoclave. The temperature is held in the range of 120°–180° C. The reaction vessel is cooled to dissipate the heat of reaction. When the required amount of ethylene oxide has been added, as evidenced by weight gain, the addition of propylene oxide is started. Propylene oxide may be added as a gas from a heated cylinder or may be added dropwise from a pressure-equalized dropping funnel. The preferred temperature during the propylene oxide addition is in the range of 130°–160° C. Temperature below 130° C. may be used, but the reaction is quite slow below this temperature. Above 160° C., undesirable side reactions may occur to an extent sufficient to impair the properties of the product.

When the required amount of propylene oxide has been added, the batch is cooled to below 100° C. and the strong base catalyst is neutralized with an acid such as aqueous sulfuric acid. The batch is then stripped to remove water introduced with the sulfuric acid and is then filtered and cooled to room temperature.

When a straight chain amine, such as n-dodecylamine, is used as the hydrophobe, it is advantageous first to prepare a hydroxyethylated derivative of the amine by reaction with ethylene oxide in the presence of water. Following this, the resulting amino alcohol is isolated and further reacted as described above.

It should be noted that the unique products herein disclosed are obtainable only when the ethylene oxide is added first. Addition of the propylene oxide first, or as a mixture with the ethylene oxide, leads to products which are much higher in foaming tendency and possess substantially no defoaming ability in comparison with the products hereinbelow claimed.

Following are descriptions of the various tests which are used to evaluate the present compositions and which, by comparative evaluation with other surfactants known to the prior art, serve to prove the superiority of our novel products. The first is a method for testing the degree of foaming tendency; it has been named the "Hamilton-Beach Foam Test" and is performed essentially as follows.

The apparatus consists of a well-known Hamilton-Beach electrically driven mixing apparatus which is inserted into a glass tube (sealed at the bottom end). In the tube are four stainless steel baffle plates held vertically. The glass tube is immersed in a water bath which maintains the temperature within 0.5 C. of the particular test temperature (in this case, 50° C.). The mixer blades are centered in the tube with the upper blade ½ inch above the solution surface. The 200 ml. of 0.1 % test solution is equilibrated to temperature and then mixed at high speed (14,500 r.p.m.) for 3 minutes. The mixer is stopped and the foam height recorded after 5 seconds. A foam height of less than 5.5 cm. is considered acceptable, and anything over that value is deemed unacceptable. Each test is usually run in duplicate.

The ability of surfactants to defoam food soils is another important requirement of surfactants which are primarily intended for use in apparatus for washing dishes and the like. The presence of any air in the water spray employed is such machines reduces the mechanical efficiency thereof by decreasing the impact of the spray on the substances. A spray of lower force than that which the machine is designed to apply would not be as effective in removing food particles. Serious foaming problems are caused by proteinaceous foods, such as egg and milk, which cause relatively large quantities of air to be trapped in the water spray. At higher concentrations, foam may also be caused by fatty or oily soils.

The food soil defoaming test is performed with a dishwasher, such as the commercially well-known Kitchen Aid apparatus, in which the speed of the rotor is a function of the quantity and character of foam. Foam pumped into the rotor imparts less momentum to the rotor upon leaving than would water without air and hence the rotor moves slower.

The detergent containing the surfactant under test is added to the machine, and the machine is allowed to fill. When the spray begins, the machine is momentarily stopped, beaten whole fresh egg or other soil is added, and the spray is allowed to continue. After 2, 3, and 4 minutes, the revolutions of the spray rotor are counted over a 30-second period. The indicated r.p.m. number is the average of these three determinations. For the prepared food soil, whose composition is described in Table I below, this number must be lat least 95 for the surfactant to be acceptable. For egg and milk, 50 is considered satisfactory at the chosen concentrations of soil and surfactant.

In Table I which follows, data is set forth which illustrate clearly the relative superiority of our novel compositions with regard to their low foaming tendencies and their ability to defoam food soils. All of the compositions above the horizontal dotted line, namely, compounds Nos. 1–8, are in accordance with the present invention as herein defined and claimed. All of these compositions, it will be noted, are acceptable when measured against the standards described above. By comparison, the compounds listed below the horizontal dotted line, namely, Nos. 9 to 13, are, by virtue of their high foaming tendency, their inability to defoam food soils satisfactorily, or both, are outside the teachings of the present invention and they are all unsatisfactory.

TABLE I

| Surfactant Composition | Hamilton-Beach Foam Test 0.1%—5 sec., 50° C. | Defoaming of Food Soils—Kitchen Aid, rpm, at 52°–57° C. | | |
|---|---|---|---|---|
| | | Prepared Food Soil [1] | Egg [2] | Milk [3] |
| 1. NP—$E_{15}P_{15}$ | 1.2 | 102 | 69 | 59 |
| 2. NP—$E_{20}P_{20}$ | 1.8 | 108 | 71 | 73 |
| 3. NP—$E_{35}P_{45}$ | 3.4 | 108 | 79 | 55 |
| 4. NP—$E_{45}P_{67.5}$ | 3.4 | 98 | 67 | 64 |
| 5. OP—$E_{35}P_{45}$ | 3.4 | 104 | 80 | -------- |
| 6. $C_{13}H_{27}OE_{35}P_{45}$* | 3.6 | 103 | 89 | -------- |
| 7. $C_{12}H_{25}NHE_{35}P_{45}H$** | 2.2 | 106 | 80 | -------- |
| 8. $C_{12}H_{25}N(E_{18}P_{22}H)_2$** | 2.3 | 102 | 83 | -------- |
| 9. NP—$E_{15}P_{10}$ | 3.4 | 96 | 49 | 48 |
| 10. OP—$E_{8.8}P_{4.5}$ | 3.5 | 94 | 32 | 45 |
| 11. OP—$E_{7.5}P_{13}$ | 0.0 | 60 | 24 | 35 |
| 12. $C_4H_9NHE_{35}P_{45}$ | 8.5 | 104 | 62 | 52 |
| 13. E–P block copolymers | 1.7 | 58 | 28 | 40 |

*A tridecyl derivative, branched $C_{13}$ hydrocarbon.
**An n-dodecyl amine derivative.
OP = octyl phenol.
NP = nonyl phenol.
E = ethylene oxide.
P = propylene oxide.
E–P = a representative commercial product made up of block copolymers of ethylene oxide and propylene oxide containing approximately 9 parts of $E_5P_{30}E_5$ units and 1 part of $E_2P_{30}E_2$.
[1] Soil used consists of 0.67% (60 gm.) of a soil made from 4 parts by weight of oleomargarine to 1 part by weight of powdered milk, and 0.45% (40 gm.) detergent consisting of 2% surfactant and an alkaline base made up of about 34% sodium tripolyphosphate, 43% sodium metasilicate pentahydrate, and 23% soda ash.
[2] 0.11% (10 gm.) whole egg, 0.30% (27 gm.) of a detergent consisting of 1.25% surfactant and the alkaline base described in note (1) above.
[3] 0.22% (20 gm.) dry milk, 0.35% (27 gm.) of a detergent consisting of 0.67% surfactant and the alkaline base described in note (1) above.

The preparation of the polyoxyalkylene surface-active agents of the present invention, which were generally described above, will be more fully understood from the following illustrative examples, wherein parts by weight are used throughout.

Example 1

NONYLPHENOL $E_{20}P_{20}$

Two hundred twenty parts or approximately 1 molar equivalent of a commercial grade of nonylphenol, which had been derived from the condensation of phenol with propylene trimer, was charged to a flask equipped with a tightly-fitting stirrer, a thermometer, an inlet tube for ethylene oxide, and a pressure gauge. Two parts of NaOH were added, and the mixture was warmed to 130° C. The flask was then purged twice with nitrogen to remove a small amount of water. Ethylene oxide was passed in while holding the temperature between the limits of 130° and 180° C. When 880 parts of ethylene oxide had been reacted, propylene oxide was passed in until 1160 parts had been reacted, the temperature being held between the limits of 130°–160° C. The batch was then cooled and the KOH neutralized with a little $H_2SO_4$.

Example 2

NONYLPHENOL $E_{45}P_{67.5}$

The procedure of Example 1 was repeated, except that 1980 parts of ethylene oxide and 3915 parts of propylene oxide were used.

Example 3

NONYLPHENOL $E_{35}P_{45}$

The procedure of Example 1 was used, except that the amounts of ethylene oxide and propylene oxide were, respectively, 1540 and 2610 parts.

Example 4

TRIDECYL ALCOHOL $E_{35}P_{45}$

In similar fashion were reacted 200 grams of a commercial tridecyl alcohol from the "oxo" process, 1540 parts of ethylene oxide, and 2610 parts of propylene oxide.

Example 5 n-DODECYLAMINE $E_{35}P_{45}$

In similar fashion were reacted 229 parts of N-β-hydroxyethyl n-dodecylamine, 1496 parts of ethylene oxide, and 2610 parts of propylene oxide.

Example 6

OCTYLPHENOL $E_{35}P_{45}$

Two hundred six parts of t-octylphenol (1,1,3,3-tetramethylbutylphenol) were reacted as described in Example 1 with 1540 parts of ethylene oxide and 2610 parts of propylene oxide.

Other uses for the present compositions, beside the principal use in mechanical dishwashing described above, will suggest themselves to those skilled in the art. For example, in conjunction with alkaline builders, the present compositions have proved effective in removing oil from steel surfaces. Because of their low foaming tendencies, this property makes the present invention particularly attractive for use in spray alkaline metal cleaning. Other areas of application include any operation where the general defoaming ability of these materials could be utilized to advantage, such as in connection with protein solutions, boiler feed water, solutions of other surfactants, resinous coating compositions, etc. A particular utility is to be found in the ability of these compositions to act most effectively as hard surface wetters even when present in such small concentrations as 25 p.p.m. Additional advantages of the present compositions exist in their textile detergency, and their surface tension reducing properties.

We claim:

1. A composition of matter having a formula from the class consisting of:

(1) 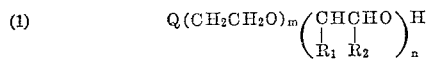

and (2) 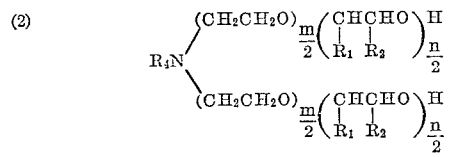

in which Q is selected from the group consisting of $R_3O$ and $R_4NH$; $R_1$ and $R_2$ are selected from the group consisting of $CH_3$ and H, with $R_1$ being $CH_3$ when $R_2$ is H, and $R_2$ being $CH_3$ when $R_1$ is H; $R_3$ is selected from the group consisting of an alkylated phenyl containing a total of 4 to 18 carbon atoms in the alkyl groups, a straight chain alkyl group having 8 to 18 carbon atoms, and a branched chain alkyl group having 8 to 18 carbon atoms; $R_4$ is a straight chain alkyl group with 8 to 18 carbon atoms; and $m$ and $n$ represent the average number of ethoxy groups and propoxy groups per mol of Q, $m$ being a number from 15 to 45 and $n$ being a number from 15 to 67.5, the ratio of $n$ over $m$ being in the range of 1:1 to 1.5:1.

2. A composition of matter having the formula nonylphenyl-(ethoxy)$_m$-(propoxy)$_n$H, where $m=15$ to 45 and $n=15$ to 67.5, the ratio of $n$ over $m$ being in the range of 1:1 to 1.5:1.

3. A composition of matter having the formula octylphenyl-(ethoxy)$_m$-(propoxy)$_n$H, where $m$ is 15 to 45, and $n$ is 15 to 67.5, the ratio of $n$ over $m$ being in the range of 1:1 to 1.5:1.

4. $C_8H_{17}C_6H_4O(C_2H_4O)_{35}(C_3H_6O)_{45}H$.
5. $C_9H_{19}C_6H_4O(C_2H_4O)_{35}(C_3H_6O)_{45}H$.
6. $C_{13}H_{27}O(C_2H_4O)_{35}(C_3H_6O)_{45}H$.
7. $n-C_{12}H_{25}NH(C_2H_4O)_{35}(C_3H_6O)_{45}H$.
8. 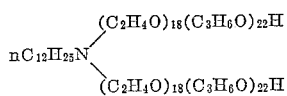

References Cited in the file of this patent

UNITED STATES PATENTS

| | | |
|---|---|---|
| 1,970,578 | Schoeller et al. | Aug. 21, 1934 |
| 2,555,285 | Black | May 29, 1951 |
| 2,673,882 | Griffin | Mar. 30, 1954 |
| 2,674,619 | Lundsted | Apr. 6, 1954 |
| 2,701,239 | Ryznar | Feb. 1, 1955 |
| 2,915,559 | Horsley et al. | Dec. 1, 1959 |

FOREIGN PATENTS

| | | |
|---|---|---|
| 538,843 | Canada | Mar. 6, 1957 |